(12) United States Patent
Mather et al.

(10) Patent No.: US 7,178,848 B1
(45) Date of Patent: Feb. 20, 2007

(54) UTILITY RACK ARRANGEMENT FOR A VEHICLE

(75) Inventors: Carl Mather, Lake Orion, MI (US); Todd R Teasdale, Canton Township, MI (US); Samer Shamon, Sterling Heights, MI (US); William E Hughes, Oxford, MI (US); Daniel T Griffin, Waterford, MI (US); David E Dawkins, Rochester Hills, MI (US); Richmond P Thomas, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/290,089

(22) Filed: Nov. 30, 2005

(51) Int. Cl.
*B60P 3/00* (2006.01)
(52) U.S. Cl. .................. 296/3; 296/37.6; 296/26.09
(58) Field of Classification Search ............... 296/3, 296/37.6, 26.09; 211/151, 191, 182, 189; 224/321, 326, 405
See application file for complete search history.

(56) References Cited

U.S. PATENT DOCUMENTS

| | | | | |
|---|---|---|---|---|
| 2,534,156 A * | 12/1950 | Wyatt et al. ............... 414/500 |
| 2,576,385 A * | 11/1951 | Bigsby ...................... 296/37.1 |
| 2,729,499 A * | 1/1956 | Eggum .................... 296/26.09 |
| 3,004,790 A * | 10/1961 | Mayer ..................... 296/26.09 |
| 4,333,678 A * | 6/1982 | Munoz et al. ............. 296/39.2 |
| 4,681,360 A | 7/1987 | Peters et al. |
| 4,824,158 A * | 4/1989 | Peters et al. ............... 296/37.6 |
| 5,100,193 A * | 3/1992 | Oprea et al. ............... 296/39.2 |
| 5,431,472 A * | 7/1995 | Coffland ........................ 296/3 |
| 5,829,945 A * | 11/1998 | Stanley .................... 296/26.09 |
| 5,938,262 A | 8/1999 | Mills |
| 6,206,624 B1 * | 3/2001 | Brandenburg ............... 410/132 |
| 6,371,564 B1 * | 4/2002 | Yates et al. ................ 296/35.3 |
| 6,705,656 B2 * | 3/2004 | Keller ...................... 296/26.09 |
| 6,860,536 B1 * | 3/2005 | Schimunek ................ 296/37.6 |
| 6,921,120 B1 | 7/2005 | Ervin |
| 7,083,219 B1 * | 8/2006 | Gregory .................... 296/37.6 |
| 2004/0050889 A1 * | 3/2004 | Shafer et al. ................ 224/403 |

* cited by examiner

Primary Examiner—Kiran B. Patel
(74) Attorney, Agent, or Firm—Thomas A. Jurecko

(57) ABSTRACT

A utility rack for a vehicle is provided. The utility rack includes a platform, at least one support rail positioned on the platform, and a plurality of storage rails connected to the at least one support rail. The plurality of storage rails have a stowed position generally parallel to the upper surface, and a deployed position generally perpendicular to the upper surface. The plurality of storage rails are arranged to pivot between the stowed position and the deployed position.

13 Claims, 7 Drawing Sheets

UTILITY RACK ARRANGEMENT FOR A VEHICLE

FIELD OF THE INVENTION

The present invention relates generally to a utility rack and storage arrangement for use with a vehicle.

BACKGROUND OF THE INVENTION

Pick-up trucks and sport-utility trucks are generally useful for transporting various types of equipment. However, certain types of equipment are inherently difficult to transport because of their size, shape, weight, etc. For this reason, among others, utility racks have been designed to accommodate such equipment. However, these utility racks tend to be suited for only one particular type of cargo and are often permanently fixed to the vehicle.

Thus, there exists a need for an improved utility rack for a vehicle that is easily affixed to the vehicle, easily configurable to carry a varying cargo load, and easily removable.

SUMMARY OF THE INVENTION

Accordingly, one aspect of the present invention is to provide a utility rack for a vehicle comprising a platform, at least one support rail positioned on the platform and a plurality of storage rails connected to the at least one support rail. The plurality of storage rails have a stowed position generally parallel to the platform, and a deployed position generally perpendicular to the platform. The plurality of storage rails are further arranged to pivot between the stowed position and the deployed position.

According to another aspect of the present invention, a utility rack for a truck bed is provided comprising an equipment box having an upper surface upwardly positioned in spaced relation to a lower surface thus defining a storage cavity therebetween. A plurality of side surfaces are generally orthogonal to the upper surface and the lower surface, and positioned between the upper surface and the lower surface forming a perimeter of the storage cavity. The lower surface is further arranged to engage a load floor of the truck bed. At least one support rail is positioned on the upper surface of the equipment box, and a plurality of storage rails are connected to the at least one support rail. The plurality of storage rails have a stowed position generally parallel with the upper surface and a deployed position generally perpendicular to the upper surface. The plurality of storage rails are further arranged to pivot between the stowed position and the deployed position.

According to yet another aspect of the present invention, the equipment box may be removed from the truck bed as a single, integral unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

Figure 1:
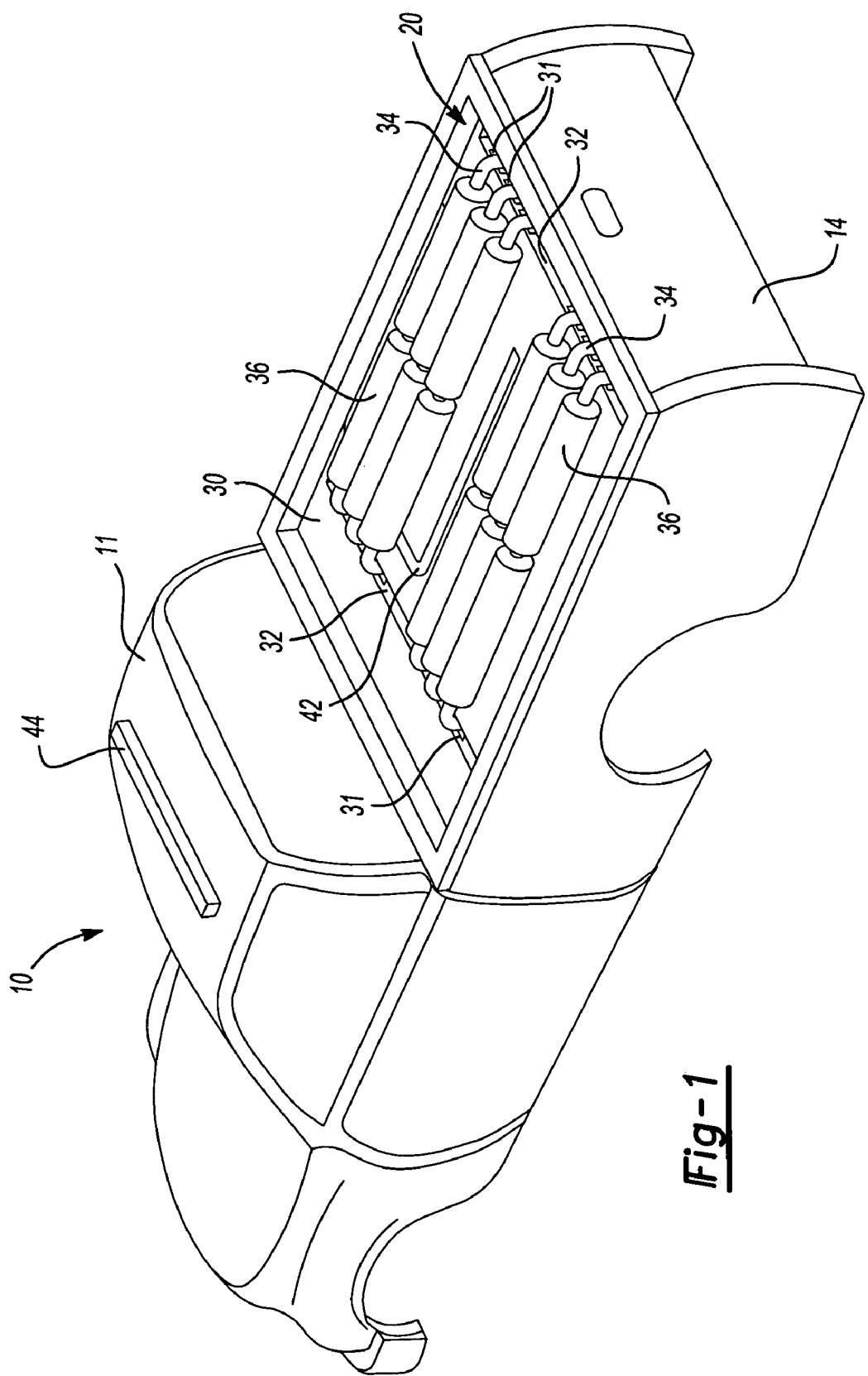
FIG. 1 shows a perspective view of a utility rack installed in a truck bed having all storage rails in a stowed position in accordance with the present invention.
Figure 6:
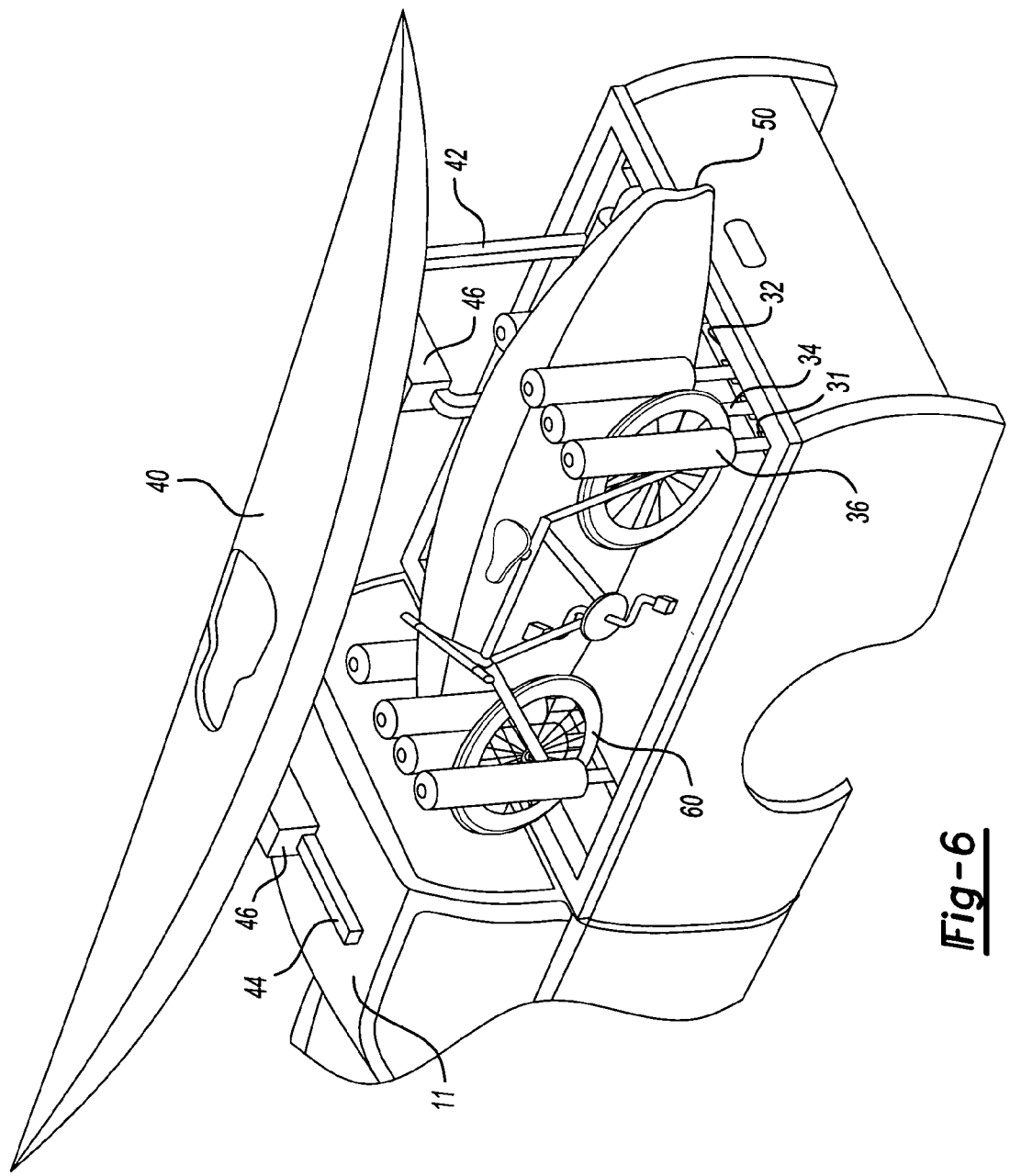
FIG. 6 shows a perspective view of a utility rack having a plurality of storage rails in a deployed position and supporting a plurality of items in accordance with the present invention.

Referring now to FIG. 1, a vehicle 10, such as a sport utility vehicle, is shown with a utility rack 20 in accordance with the present invention. It should be noted, however, that utility rack 20 could also be installed into a trailer or other vehicles without departing from the spirit and scope of the invention. According to a first exemplary embodiment of the present invention, the utility rack 20 has a platform surface 30, a pair of support rails 32, and a plurality of storage rails 34. The plurality of storage rails 34 are further arranged to pivot between a stowed position, shown, for example, in FIGS. 1 and 3, and a deployed position, shown, for example, in FIGS. 4 and 6. When any of the plurality of storage rails 34 are in the deployed position, they are arranged to receive items between them, such as, for example, a kayak 50, or mountain bike 60.

The plurality of storage rails 34 are connected to one of the pair of support rails 32 through a slider mechanism 31. The slider mechanism 31 enables the plurality of storage rails 34 to translate along the pair of support rails 32 to a variety of predetermined positions. Each of the plurality of storage rails 34 may further be covered by a padding 36. The slider mechanism 31 allows the storage rails to squeeze together to secure exemplary items 50, 60 while padding 36 supports and protects exemplary items 50, 60. A retractable strap (not shown) could then be stretched across the width of utility rack 20 to prevent any potential vertical movement of exemplary items 50, 60.

Figure 2:
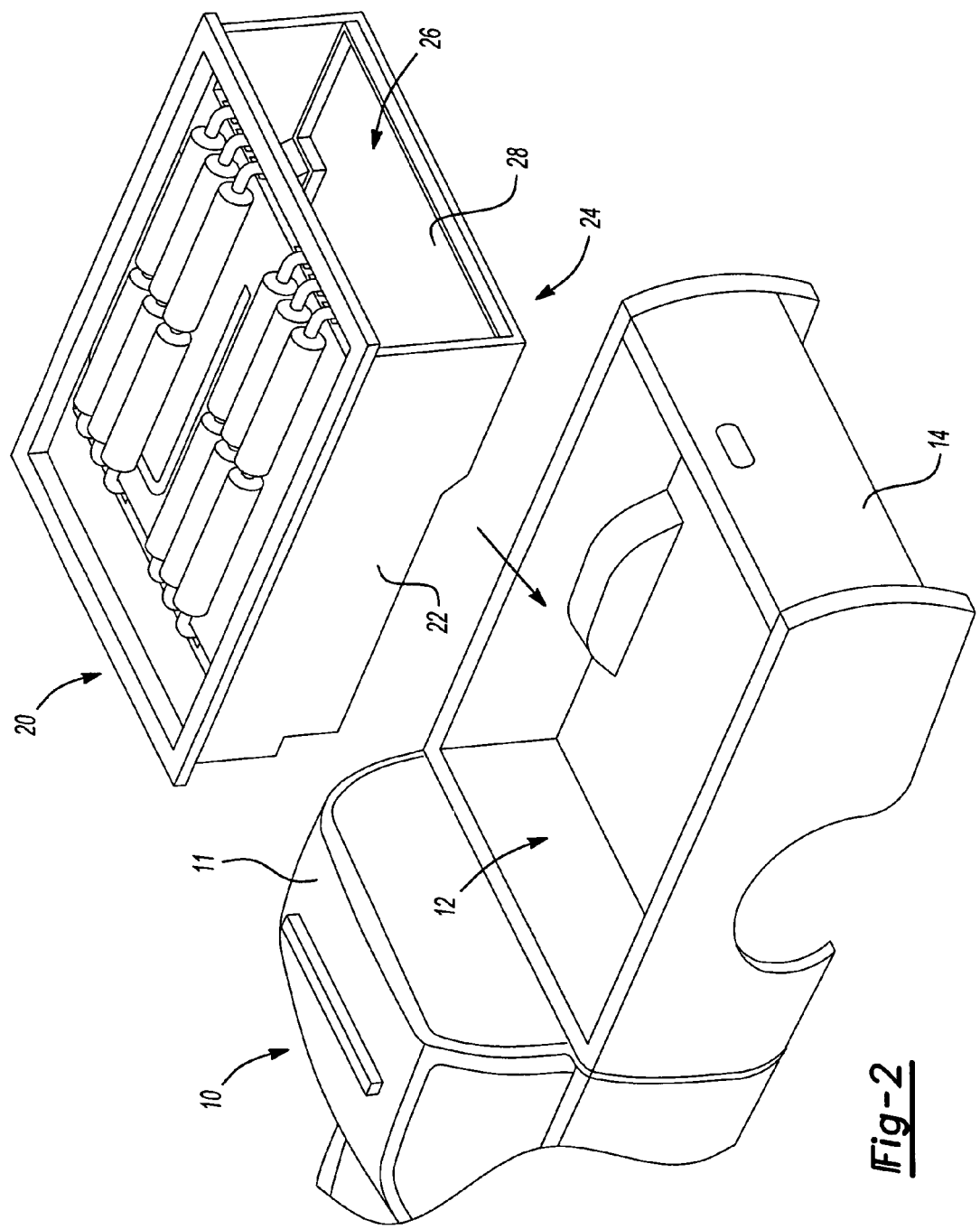
FIG. 2 shows a perspective view of a utility rack removed from the truck bed in accordance with the present invention.

Referring now to FIG. 2, the utility rack 20 is shown removed from the bed of the truck 10. In addition to platform surface 30, the utility rack further comprises a lower support surface 24 and a plurality of side surfaces 22 arranged to form a perimeter of a storage cavity 26. The lower support surface 24 is arranged to engage a load floor of a truck bed 12. The utility rack 20 can also be removed from the truck bed 12 as a single, integral unit. In accordance with a second exemplary embodiment, the platform surface 30 engages directly with the bed rail of the truck bed 12, thereby dispensing with the need for the lower support surface 24 and the plurality of side surfaces 22.

Figure 3:
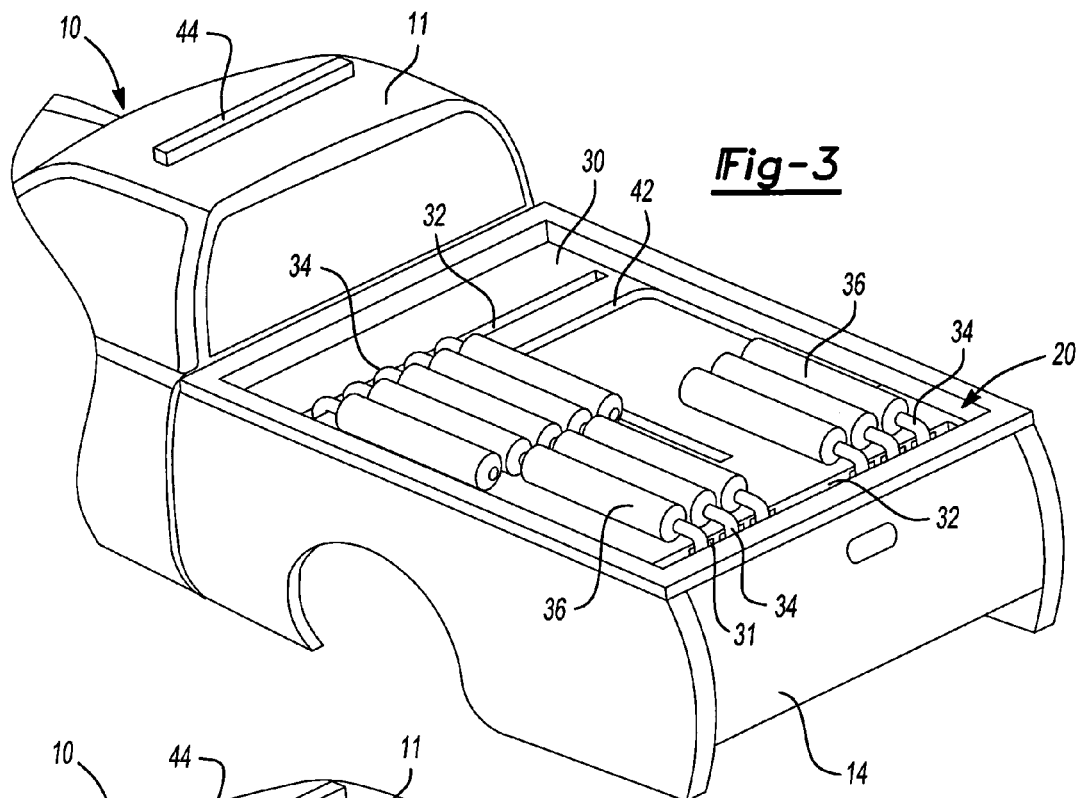
FIG. 3 shows a perspective view of an alternate arrangement of storage rails in the utility rack in accordance with the present invention.
Figure 4:
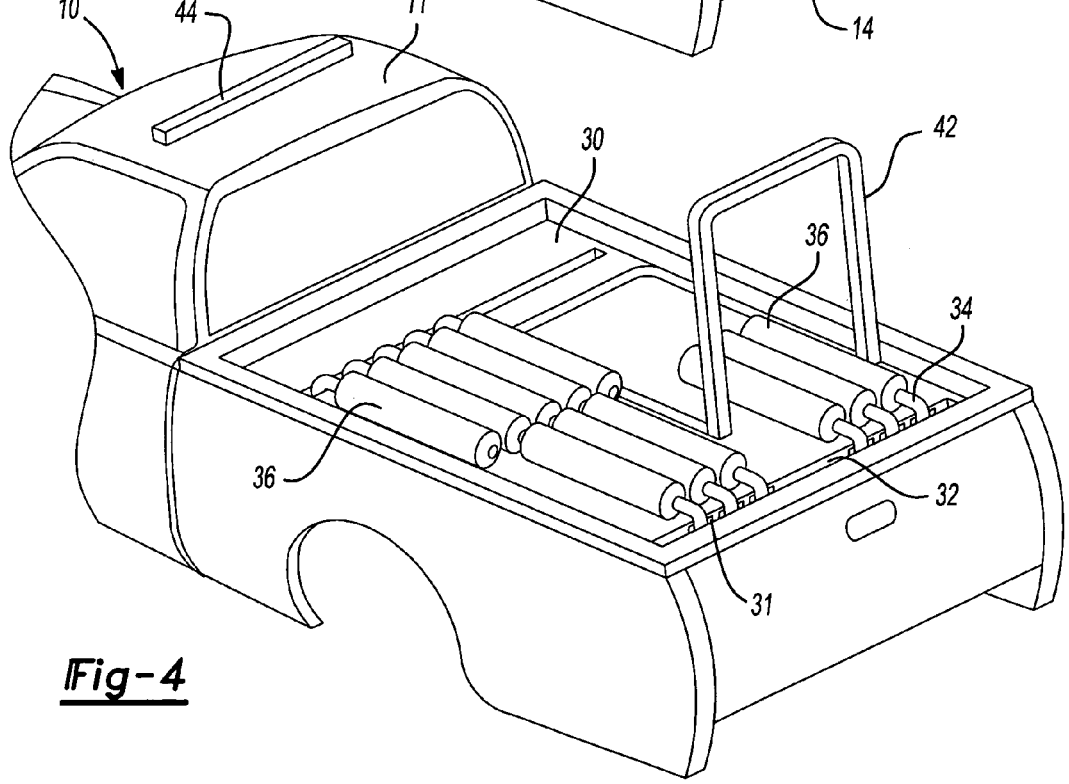
FIG. 4 shows a perspective view of a utility rack with a U-shaped storage rail in a deployed position in accordance with the present invention.
Figure 5:
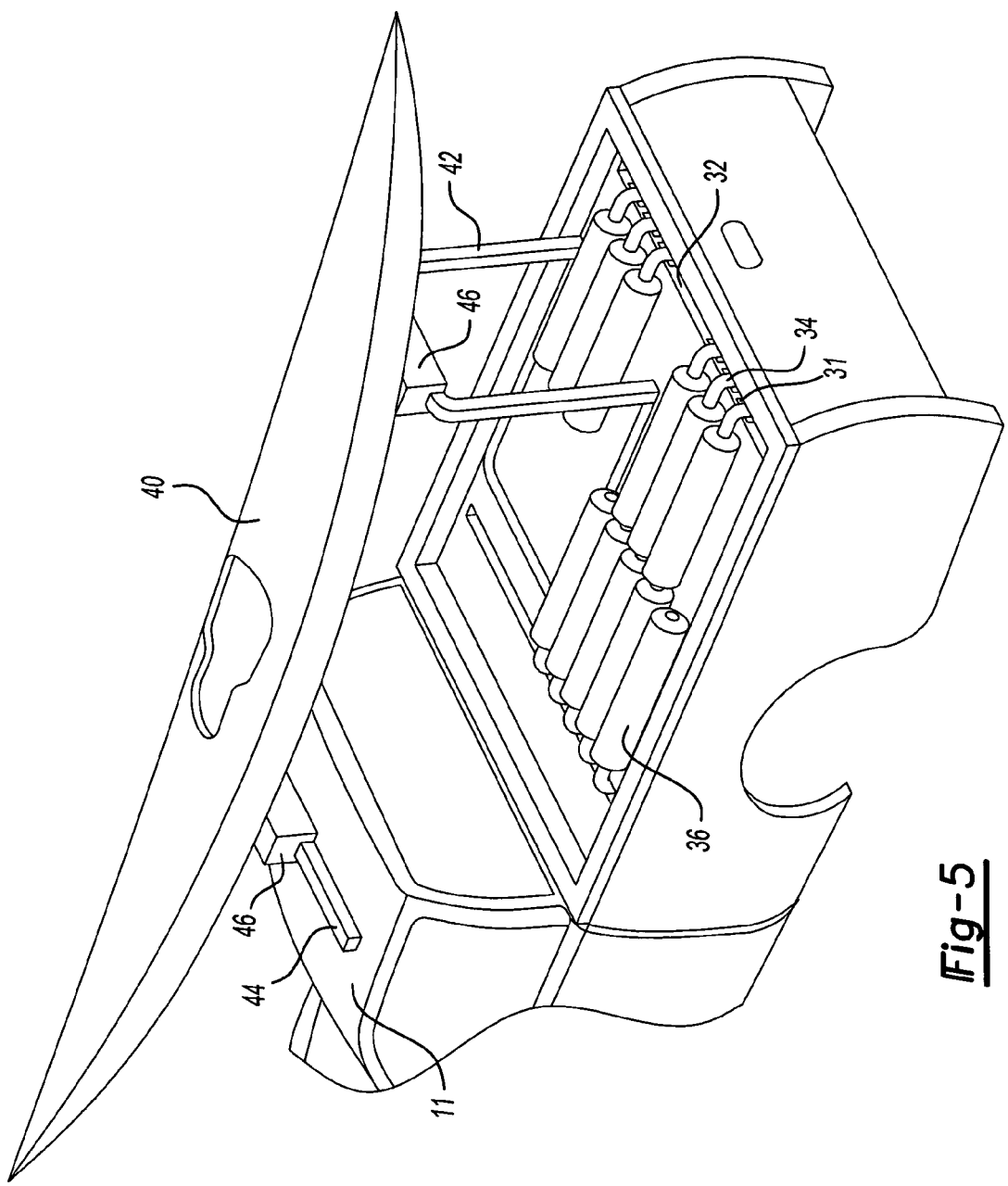
FIG. 5 shows a perspective view of a utility rack supporting an item on the U-shaped rail in accordance with the present invention.

Referring now to FIGS. 3–5, according to an aspect of either embodiment, a portion of the plurality of storage rails 34 are translated to reveal a U-shaped storage rail 42 positioned on the platform surface 30. The U-shaped storage rail 42 is pivotally connected to the platform surface 30 and arranged to pivot between a stowed position, shown, for example in FIG. 3, and a deployed position, shown, for example, in FIGS. 4 and 5. The U-shaped storage rail 42 is arranged to support items that are too large to be stored within the truck bed 12, such as, for example, a sea kayak 40. In accordance with another aspect of either embodiment, a roof support rail 44 is provided and attached to the vehicle roof 11 to further support large items such as sea kayak 40.

Figure 7:
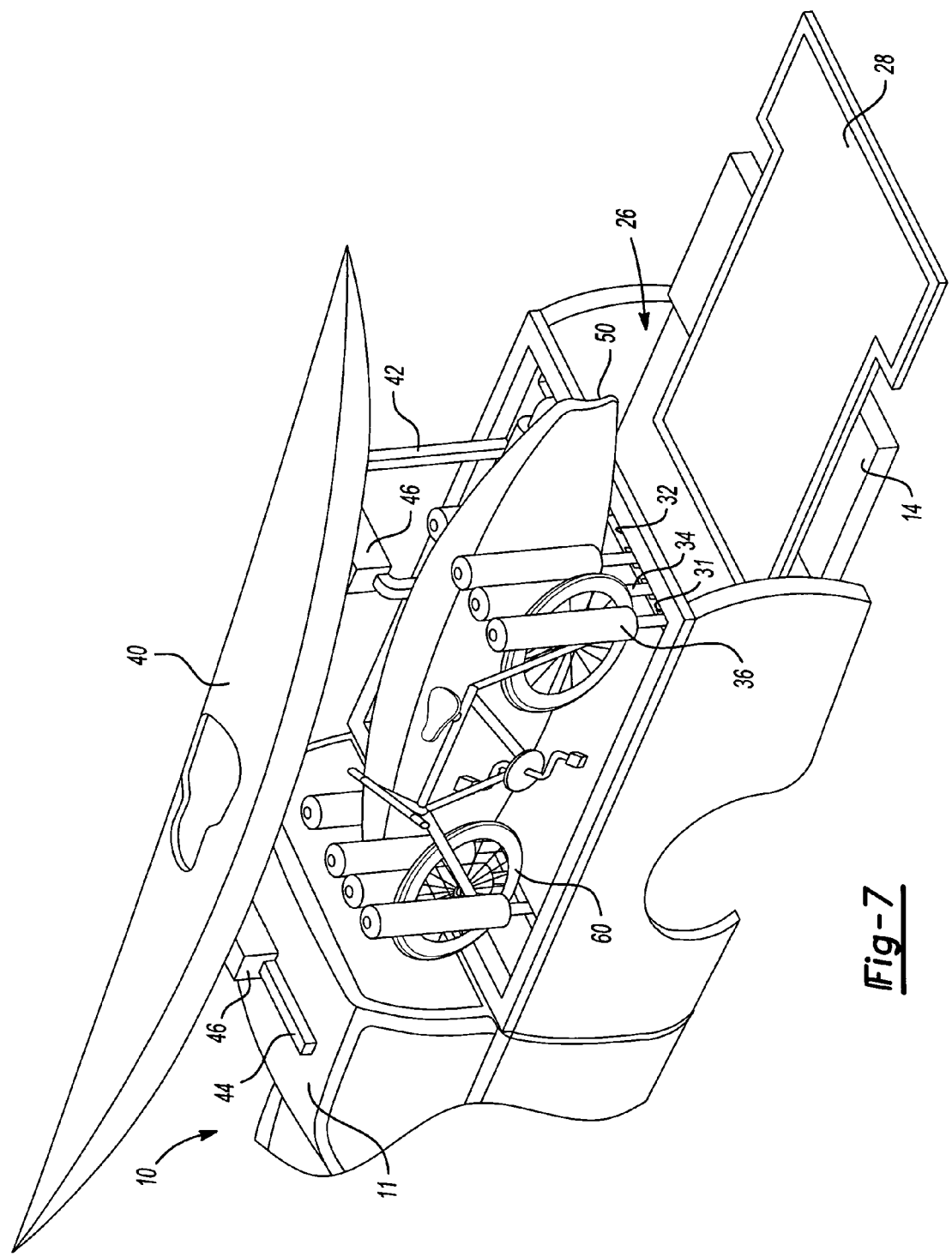
FIG. 7 shows a perspective view of a utility rack with deployed equipment tray in accordance with the present invention.
Figure 8:
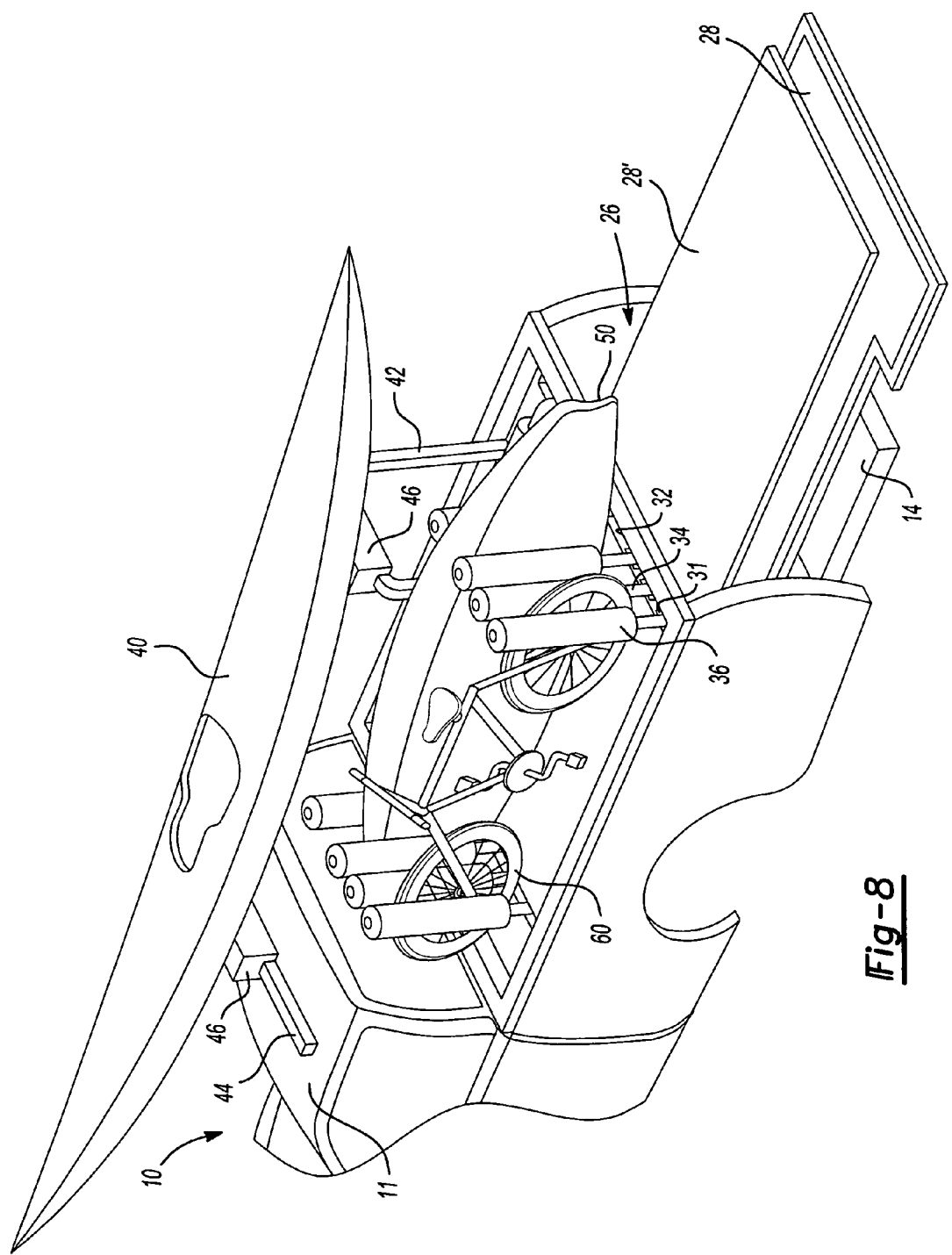
FIG. 8 shows a perspective view of a utility rack with a plurality of deployed equipment trays in accordance with the present invention.

Referring now to FIG. 7, according to a third exemplary embodiment, an equipment tray 28 is shown extended from the storage cavity 26. The equipment tray 28 may be accessed by lowering the tailgate 14 and sliding the equipment tray 28 out, away from the storage cavity 26. The equipment tray 28 allows a user (not shown) to store and access items (not shown) within the storage cavity 26 without having to reach beneath platform surface 30. Referring now to FIG. 8, according to a fourth exemplary embodiment, the storage cavity 26 is arranged to support multiple equipment trays 28 and 28'.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle comprising:
  a load floor;
  an equipment box having an upper surface upwardly positioned in spaced relation from a lower surface defining a storage cavity therebetween, and a plurality of side surfaces generally orthogonal to the upper surface and the lower surface, the plurality of side surfaces positioned between the upper surface and the lower surface forming a perimeter of the storage cavity wherein the lower surface is arranged to engage the load floor of the vehicle;
  at least one support rail positioned on the upper surface of the equipment box; and
  a plurality of storage rails connected to the at least one support rail, the plurality of storage rails having a stowed position generally parallel with the upper surface, and a deployed position generally perpendicular to the upper surface, the plurality of storage rails further arranged to pivot between the stowed position and the deployed position.

2. The vehicle of claim 1, wherein the equipment box may be removed from the load floor as a single, integral unit.

3. The vehicle of claim 1, further comprising a plurality of sliders positioned on the at least one support rail, the plurality of sliders allowing the plurality of storage rails to translate relative to the vehicle.

4. The vehicle of claim 3, wherein the plurality of storage rails are respectively connected to the plurality of sliders.

5. The vehicle of claim 1, further comprising a plurality of pads covering the plurality of storage rails.

6. The vehicle of claim 1, further comprising at least one U-shaped support rail being substantially parallel to the upper surface in a stowed position and substantially perpendicular to the upper surface in a deployed position.

7. The vehicle of claim 6, wherein the at least one U-shaped support rail pivots between the stowed position and the deployed position relative to the upper surface.

8. The vehicle of claim 1, wherein the load floor is a truck bed.

9. The vehicle of claim 8, wherein the platform is arranged to engage at least a pair of body panels extending from the truck bed.

10. The vehicle of claim 1, wherein the at least one support rail comprises a single rail formed from four peripheral members generally orthogonal to one another.

11. The vehicle of claim 1, wherein each of the plurality of storage rails are arranged to be pivoted independently of one another.

12. The vehicle of claim 1, further comprising at least one equipment tray positioned between the upper surface of the equipment box and the lower surface of the equipment box and including a storage position disposed substantially within the storage cavity and an access position extending away from the storage cavity.

13. The vehicle of claim 12, wherein the at least one equipment tray translates relative to the load floor between the storage position and the access position.

\* \* \* \* \*